May 10, 1966  J. M. J. DELSUC  3,250,137
TRANSVERSE STABILIZING DEVICES FOR VEHICLES
Filed April 2, 1962                          2 Sheets-Sheet 1

Inventor
Jacques Marie Jules Delsuc
By Stevens, Davis, Miller & Mosher
Attorneys United States Patent Office 3,250,137
Patented May 10, 1966

3,250,137
TRANSVERSE STABILIZING DEVICES
FOR VEHICLES
Jacques Marie Jules Delsuc, 101 Ave. Mozart,
Paris, France
Filed Apr. 2, 1962, Ser. No. 184,394
5 Claims. (Cl. 74—5.6)

This invention relates to the transverse stabilization of vehicles of which the suspension system is equipped with trim corrector means.

This invention is concerned more particularly with a stabilization control device relying more specifically on a gyroscope and a pendulum for controlling the trim corrector means of the suspension system.

The terms "trim corrector means" are intended to designate in this specification and in the following claims any system adapted, notably, as already known to those conversant with the art, to distribute a fluid under pressure among the trim corrector cylinders forming an internal part of wheel suspension systems on the right-hand and left-hand side of the vehicle.

More particularly, in the specific form of embodiment contemplated herein the gyroscope and the pendulum are operatively interconnected by utilizing firstly the gyroscope, characterized by an intrinsically quick response time, for controlling the beginning of the trim correction if necessary, and secondly the pendulum, with due consideration for its inertia, for completing the desirable correction, the pendulum-actuated control means being responsive to the gyroscope-actuated control means and substituted thereto under stabilized running conditions.

According to this invention, this arrangement relates to a device ensuring the transverse stabilization of a vehicle having a suspension system equipped with trim corrector means, which comprises, for controlling the action of said last-named means, a turn detector gyroscope provided with an oscillating precession frame and a pendulum responsive to apparent gravity, a balance-beam movable about the axis of said precession frame, resilient means connecting said balance-beam to said frame and urging aid balance-beam to a given position in relation to said frame, this position being called a position of coincidence, damping means connected to said balance-beam to introduce a timelag in the movement of the balance-beam with respect to movement of the frame when this frame is caused to incline, e.g., due to a turn of the vehicle, and consequently the balance beam is urged into the position of coincidence by the resilient means, a device for regulating the trim correction, a control circuit for operating said last-named device and including first cooperating control means carried by said frame and said balance-beam, said first control means being adapted, according to the direction of relative shift between said frame and said balance-beam, to operate said device regulating the trim correction in one or the other direction, and second cooperating control means responsive to said first cooperating control means and carried partly by said pendulum and partly in a fixed position in relation to the vehicle, said second control means being rendered operative by said first control means in the aforesaid so-called position of coincidence and adapted, according to the relative transverse inclination of the pendulum and of the vehicle outside a normal position of the latter corresponding to the correct trim, to operate said device regulating the trim correction in the direction corresponding to the neutralization of said relative inclination.

This arrangement is particularly advantageous for electrically controlling the trim corrector control device, in preference to a fluid-pressure control circuit which, although feasible in the present state of the art, would be more complicated and attended by a slower response time.

Moreover, the device according to this invention may be constructed as a compact, self-contained apparatus to be mounted as a unit on the vehicle.

A typical embodiment of this device will now be described by way of example with reference to the accompanying drawings, in which.

Figure 1:
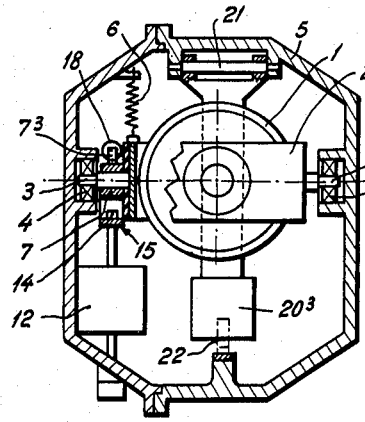
FIG. 1 is a vertical section taken through the device along the precession axis of the gyroscope and along the axis of the pendular weight.
Figure 2:
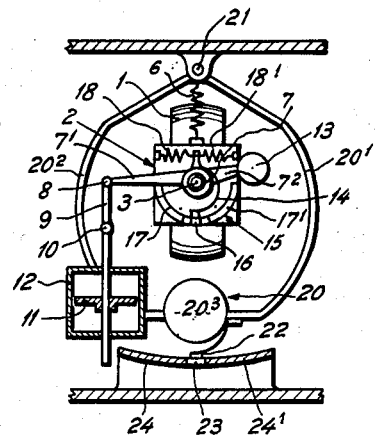
FIGURE 2 is a part-sectional elevational view of the same device as seen from the left-hand side of FIG. 1, the corresponding portion of the casing being removed.

In the device thus illustrated the gyroscope flywheel 1 is supported by the precession frame 2 having its rocking pivots or trunnions 3, 3' journalled in a pair of aligned horizontal bearings 4, 4' solid with two elements constituting the casing 5 of the apparatus, these elements being made of electrically insulating material. A spring 6 normally urges the precession frame to a fixed position in relation to the casing 5 (see FIGS. 1 and 2). This gyroscope, of a type well known in aircraft instrument construction as a turn-indicator, may be driven either from an electromotor or from a vane and air-nozzle system, in which case the casing 5 may be subjected to a certain vacuum in relation to an external atmosphere.

On the other hand, in the casing 5 a horizontal balance-beam 7 is mounted for free oscillation about the axis of pivots 3, 3'.

This balance-beam 7 comprises on the one hand an arm $7^1$ having its outer end pivotally connected at 8 to a link 9 connected in turn through a pivot 10 to the rod of a piston 11 slidably mounted in a cylinder 12, this piston and cylinder assembly 11, 12 constituting a pneumatic dashpot. The other arm $7^2$ of the balance-beam 7 carries a weight 13 constituting a counterweight for balancing the weights of the movable elements of the damping system incorporating the dash-pot 11, 12, in order normally to maintain the balance-beam 7 in a state of neutral equilibrium in relation to gravity.

This balance-beam 7 carries in addition a brush 14 engaging a concave semi-circular collector 15 rigid with and/electrically insulated from, the aforesaid precession frame. This collector carries three contact segments insulated from one another and consisting of a central segment 16 spaced from a pair of end segments 17, $17^1$ disposed on either side.

Moreover, the balance-beam 7 is connected through springs 18, $18^1$ to said precession frame 2, these springs being anchored to a radial arm $7^3$ of the balance-beam and tending, with due consideration for the deflections of the gyroscope precession frame, constantly to restore the balance-beam in a predetermined so-called position of coincidence in relation of said precession frame, wherein the brush 14 contacts the central segment 16.

Now it will be seen that this restoring movement can only take place with a certain timelag since the deflections of the precession frame occur rather rapidly, this time lag being introduced by the damping dash-pot 11, 12.

In the casing 5, furthermore, the pendulum 20 is mounted for oscillation about a shaft 21 parallel to the pivots 3–3' of the gyroscope frame, this shaft 21 overlying the gyroscope in this arrangement and carrying a pair of arms $20^1$, $20^2$ straddling the gyroscope and having their lower portion connected to the pendular weight $20^3$. It will be seen that the device may be so mounted on the vehicle that the shaft 21 of the pendulum will be substantially parallel to the longitudinal plane of symmetry of the vehicle. However, it will be noted that the pivots 3–3' of the gyroscope precession frame may have any other desired orientation in relation to the vehicle than that illustrated in this specific embodiment, provided that this orientation is not vertical or approximately vertical.

The pendulum 20 carries another brush 22 co-acting with a collector secured on the casing 5. When this pendulum is in its neutral position in relation to the casing, that is, in relation to the normal trim of the vehicle on which this casing is rigidly mounted, the brush 22 contacts a non-conductive central portion 23 of the collector, two conductive side segments 24, $24^1$ extending on either side of this insulating portion 23.

This pendulum 20 may be controlled by a damping device (not shown) adapted to eliminate the small low-frequency accidental pendular oscillation.

The gyroscope, the balance-beam and the pendulum co-operate electrically in a circuit comprising two electromagnets 25, $25^1$ (FIG. 3) acting in this embodiment in opposition upon a common armature 26 pivoted on a pin 27, the movements of this armature on either side of its intermediate position being utilized by controlling the correction of the transverse trim of the vehicle in one or the other direction. To this end this armature may be connected for example to a distributor adapted to distribute fluid under pressure among trim corrector cylinders incorporated in the right-hand and left-hand wheel suspension systems of the vehicle, which may consist notably of hydraulic chambers of hydropneumatic suspension units of known type.

Figure 3:
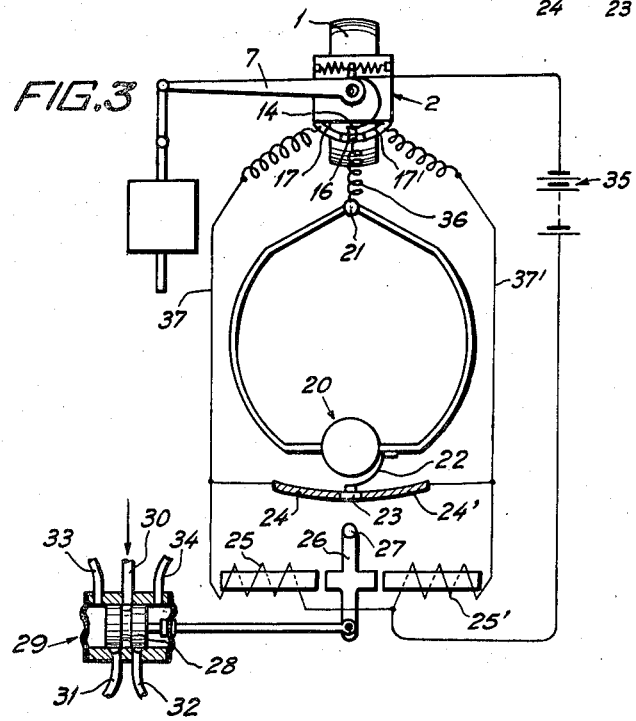
FIGURE 3 is a diagrammatic view showing the control circuits of the device.

This arrangement is illustrated diagrammatically by way of example in FIG. 3, the armature 26 being connected to the rod controlling the movable member or slide-valve 28 of a distributor 29 connected to a source of pressure fluid through a line 30 for connecting this source with either of a pair of lines 31, 32 connected in turn respectively to the left-hand and right-hand trim corrector cylinders of the vehicle (not shown). This distributor further comprises exhaust lines 33, 34 corresponding to the trim corrector cylinder lines 31, 32 respectively.

This distributor control system may be embodied in the form of a suitable electromagnetic valve.

The electrical control circuit is established as follows. The balance-beam 7 and its brush 14 are connected to one terminal of a storage battery, for example the storage battery of the vehicle, through the medium of the mass of the gyroscope.

The central segment 16 of the collector carried by the precession frame is connected through a flexible wire 36 to the pendulum 20 and through the mass of this pendulum to the brush 22.

The segments 17 and $17^1$ are connected through other flexible wires to the wires 37, $37^1$ connected respectively to one terminal of the electromagnets 25 and $25^1$, the other terminals of these electromagnets being connected to each other and to the other terminal of the battery 35.

Moreover, the wires 37 and $37^1$ are connected respectively to the segments 24 and $24^1$ of the other collector associated with the pendulum. This device operates as follows:

When the vehicle begins to negotiate a turn, the gyroscope reacts immediately and tilts its precession frame 2 in a direction corresponding to the direction of turn. Through the brush contacting either of segments 17 or $17^1$ and through the corresponding wires 37 or $37^1$, one of the electromagnets 25 or $25^1$ is energized and the action for correcting the trim of the vehicle begins immediately, before the deflection due to the apparent gravity has become effective due to the delay caused by the inertia of the mass of the vehicle.

With the correction thus started, the balance-beam 7 will reset itself on the precession frame 2 with a timelag produced by the dash-pot 11, 12 and during the return to the normal position of coincidence between the frame and its balance-beam the latter will open the previously established circuit energizing the electromagnet through one of the side segments 17, $17^1$ by resuming its engagement with the central segment 16. However, during this time interval the pendulum 20 will be deflected from its position of equilibrium due to the influence of the centrifugal force. Now if the aforesaid position of coincidence is restored, the trim inclination of the vehicle will at this time be sufficient, and the pendulum brush 22 will be in its neutral position and the electromagnets 25, $25^1$ will remain de-energized; nevertheless, the brush 22 will remain energized. If the transverse inclination given to the vehicle by the first correction produced by the gyroscope action is either insufficient or excessive, one of the segments 24, $24^1$ and therefore the corresponding electromagnet 25 or $25^1$ will be energized in order to modify the present trim and determine more accurately the proper trim of the vehicle, in which the brush 22 will recover its neutral position.

During the time necessary for negotiating the turn under stabilized trim conditions the precession frame of the gyroscope will remain inclined by a certain angle from the reference position which it normally occupies in relation to the casing, and as the balance-beam 7 remains coincident with the frame the pendulum may bring about at this time any necessary correction due to the energization of brush 22. However, if a change in the running conditions takes place, for example if the direction of turn is inverted, or if the angular speed is modified, a momentary shift will occur between the gyroscope and the balance-beam. The brush 22 of pendulum 20 will thus become de-energized and the pendulum action will be neutralized to the benefit of the gyroscope action of which the brush 14 will energize one of the electromagnets 25, $25^1$.

Thus, the gyroscope will resume immediately the control of the transverse stabilization of the vehicle until the balance-beam 7 is again coincident with the precession frame of the gyroscope.

The time lag brought in this return to the condition of coincidence may be adjusted as a function of the inertia of the pendulum so that the action of this pendulum is substituted in due time for the gyroscope action.

When the vehicle is running in straight line (this corresponding to the operation under stabilized conditions wherein the balance-beam is nearly constantly re-shifted in relation to the gyroscope), the stabilization is controlled completely by the pendulum. It takes place normally in relation to the absolute vertical irrespective of the transverse slant of the road, even if the road is cambered.

To avoid the use of excessive current strengths in the electrical control contacts, as this would involve contact pressures likely to disturb the positions of equilibrium of the device, one of the following solutions may be adhered to:

(1) using low-current contacts co-operating with a power relay system controlling the energization of electromagnets 25 and $25^1$;

(2) using mercury switches;

(3) using a system incorporating capacitors and amplifier tubes.

These known solutions are merely a matter of choice for, as far as the contacts between the precession frame and the balance-beam, a sufficient torque is available for producing a sharp or satisfactory switching by simply using ordinary friction contacts.

Thus, direct contacts may be used in the case of the pendulum by construction the latter with a sufficient mass.

Figure 4:
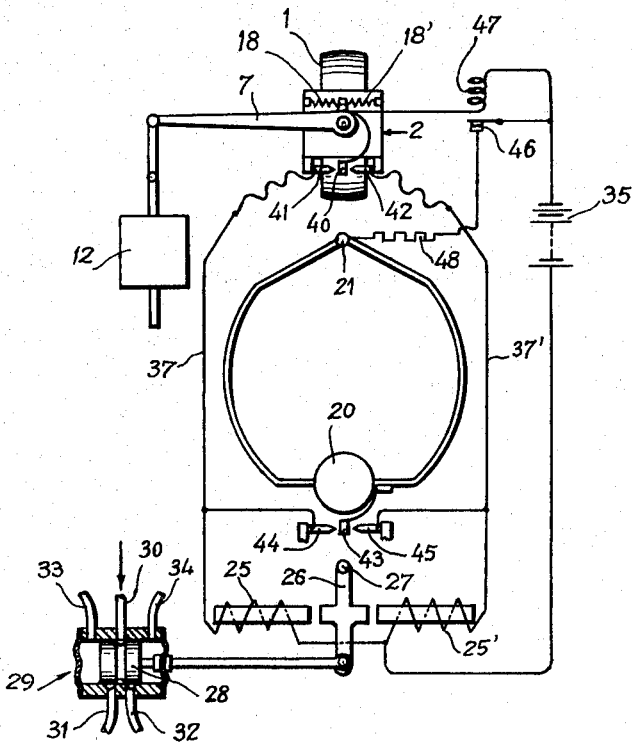
FIGURE 4 is another diagrammatic view showing an alternate embodiment of the device.

A preferred solution utilizing non-friction contacts is illustrated in FIG. 4 wherein the non-modified component elements of the device described hereinabove are designated by the same reference numerals.

In this alternate embodiment, the balance-beam 7 carries a spring blade provided with a contact 40 adapted to travel in the gap left between a pair of studs 41, 42 solid with the precession frame 2 of the gyroscope, these studs being the equivalent of segments 17 and $17^1$ of the preceding form of embodiment. Similarly, the pendulum carries a spring blade provided with a contact 43 adapted to travel in the gap left between a pair of studs 44, 45 rigid with the casing of the device, which are the equivalent of segments 24, $24^1$ already cited.

On the other hand, in this case the contact 43 of the pendulum is energized from the storage battery 35 through a back contact 46 of a relay having its coil 47 inserted in the circuit section extending from the battery to the contact 40, this contact 46 being normally closed and opening when the relay winding is energized, a resistance 48 being adapted to be inserted into the circuit section passing through this contact 46.

The operation will be readily understood from the equivalences pointed out hereinabove and from the preceding description; therefore, this operation will only be briefly summarized hereinafter.

In the so-called position of coincidence wherein the contact 40 does not engage any of studs 41 or 42, that is, when the vehicle is running along a straight line or when the vehicle is turning under stabilised conditions, the winding 47 of the relay is not energized and the pendulum, through its contact 43 energized through the back contact 46, will provide alone the desired stabilization by co-acting with the fixed studs 44, 45 between which the movable contact 43 is in neutral position due to the aforesaid stabilization.

On the other hand, immediately as a turn begins, the gyroscope reaction causes the contact 40 to engage one of the fixed studs 41 or 42 whereby the trim correction will be controlled immediately through one of the electromagnets 25 or $25^1$ which is no more controlled by the pendulum due to the opening of contact 46 which is caused by the energization of the relay winding 47. The pendulum resumes its control action only when the balance-beam 7 is re-shifted on the precession frame in the so-called position of coincidence, with the timelag resulting from the operation of the dash-pot 11, 12, the gyroscope resuming in turn its control action if any change takes place after a turn has begun.

I claim:

1. Device ensuring the transverse stabilization of a vehicle having a suspension system equipped with trim corrector means, which comprises, for controlling the action of said last-named means, a turn detector gyroscope provided with an oscillating precession frame, a pendulum responsive to apparent gravity, a balance-beam movable about the axis of said precession frame, resilient means connecting said balance-beam to said frame and urging said balance-beam to a given position in relation to said frame, this position being called a position of coincidence, damping means connected to said balance-beam to introduce a timelag in the movement of said balance-beam with respect to movement of said frame when said frame is caused to incline and consequently said balance-beam is urged by said resilient means to follow said frame into said position of coincidence, a device for regulating the trim correction, a control circuit for operating said last-named device and including first cooperating control means carried by said frame and said balance-beam, said first control means being adapted, according to the direction of relative shift between said frame and said balance-beam, to operate said device regulating the trim correction in one or the other direction, and second cooperating control means responsive to said first cooperating control means and carried partly by said pendulum and partly in a fixed position in relation to the vehicle, said second control means being rendered operative by said first control means in the aforesaid so-called position of coincidence and adapted, according to the relative transverse inclination of the pendulum and of the vehicle outside a normal position of the latter corresponding to the correct trim, to operate said device regulating the trim correction in the direction corresponding to the neutralization of said relative inclination.

2. Device according to claim 1, wherein said control circuit comprises two electromagnets adapted to operate said device regulating the trim correction in one or the other direction respectively, said electromagnets being mounted in circuit with two contacts forming part of said first control means so as to be energized according to the direction of the relative shift between said frame and said balance-beam, said control members being also mounted in circuit with two contacts forming part of said second control means so as to be energized according to the relative transverse inclination between the pendulum and the vehicle, through a third contact forming part of said first control means and operative in said position of coincidence.

3. Device according to claim 1, wherein said control circuit comprises a voltage source and wherein said first control means carried by said frame and said balance-beam consists of electrical contacts comprising on one of these last-named elements, a first control contact member connected to one terminal of said voltage source, and on the other of these elements, on either side of said contact member in relation to said position of coincidence, two contact members with which it cooperates according to the possible relative shift occurring between said frame and said balance-beam, said last-named contact members being connected to a pair of electro-magnets connected in turn to the other terminal of said voltage source and adapted to control the trim correction in one or the other direction respectively, said second control means connected to the pendulum and to the vehicle comprising on one of said elements a first control contact member energized in said position of coincidence, and on the other of said elements, on either side of said last-named contact member, two contact members with which it cooperates according to the relative transverse inclination of the pendulum and of the vehicle, said last-named contact members being also connected to said electro-magnets.

4. Device according to claim 3, wherein said first control contact member forming part of said second control means is energized through a contact member with which said first control contact member cooperates forming part of said first control means.

5. Device according to claim 3, wherein said first control contact member forming part of said second control means is energized through a back-contact forming part of a relay having its winding disposed between said voltage source and said first control contact member forming part of said first control means.

References Cited by the Examiner

UNITED STATES PATENTS 2,679,366 5/1954 Noxon _____ 74—5.46 X
3,021,714 2/1962 Moller _____ 74—5.6

BROUGHTON G. DURHAM, *Primary Examiner.*

T. W. SHEAR, *Assistant Examiner.*